(12) United States Patent
Reiners et al.

(10) Patent No.: US 10,800,233 B2
(45) Date of Patent: Oct. 13, 2020

(54) REMOVABLE VEHICLE HARDTOP STORAGE SUPPORT

(71) Applicant: FORD GLOBAL TECHNOLOGIES, LLC, Dearborn, MI (US)

(72) Inventors: Robert Reiners, Grosse Ile, MI (US); Jack Marchlewski, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 103 days.

(21) Appl. No.: 16/247,679

(22) Filed: Jan. 15, 2019

(65) Prior Publication Data

US 2020/0223299 A1 Jul. 16, 2020

(51) Int. Cl.
*B60J 7/16* (2006.01)
*B60J 7/10* (2006.01)
*B60J 7/20* (2006.01)

(52) U.S. Cl.
CPC ............ *B60J 7/1635* (2013.01); *B60J 7/106* (2013.01); *B60J 7/20* (2013.01)

(58) Field of Classification Search
CPC ............ B60J 7/1635; B60J 7/106; B60J 7/20
USPC .................................................... 296/100.02
See application file for complete search history.

(56) References Cited

U.S. PATENT DOCUMENTS

| | | | | |
|---|---|---|---|---|
| 3,065,021 A * | 11/1962 | Geiger | ..................... | B60J 7/106 296/102 |
| 4,978,161 A * | 12/1990 | Schulze | ................... | B60J 7/106 29/401.1 |
| 5,263,687 A * | 11/1993 | Garbiso | .................... | B60J 11/00 248/327 |
| 5,803,529 A * | 9/1998 | Perry-Bores | ............... | B60J 7/10 296/107.09 |
| 6,543,834 B2 | 4/2003 | Sisson et al. | | |
| 6,921,077 B1 * | 7/2005 | Pupo | ........................ | B60J 7/106 296/102 |
| 6,959,918 B1 * | 11/2005 | Samuels | .................. | B60J 7/106 248/327 |
| 7,469,954 B2 * | 12/2008 | Fallis, III | ................... | B60J 7/10 296/105 |
| 7,568,678 B2 * | 8/2009 | Hammond | ................ | B66C 1/62 248/327 |
| 8,991,896 B1 * | 3/2015 | Whitehead | ............... | B60J 7/106 296/121 |
| 10,173,507 B2 * | 1/2019 | Rodriguez | ............. | B60J 1/1838 |
| 2019/0241053 A1 * | 8/2019 | Desai | ........................ | B60J 1/14 |

FOREIGN PATENT DOCUMENTS

| | | |
|---|---|---|
| DE | 2929915 A1 | 2/1981 |
| DE | 9004619 U1 | 6/1990 |
| DE | 202006017928 U1 | 2/2007 |
| EP | 0529288 B1 | 12/1994 |

* cited by examiner

*Primary Examiner* — Pinel E Romain
(74) *Attorney, Agent, or Firm* — David Coppiellie; MacMillan, Sobanski & Todd, LLC

(57) ABSTRACT

A vehicle with removable hardtop may include vehicle sides having footrest cavities and pin recesses through top rails. The hardtop has sides resting on the top rails, locating pins extending downward from the bottom edges into respective pin recesses, and footrests extending downward from the bottom edges, farther than the locating pins, into respective footrest cavities with greater clearance than the locating pins in the pin recesses.

9 Claims, 3 Drawing Sheets

REMOVABLE VEHICLE HARDTOP STORAGE SUPPORT

BACKGROUND OF THE INVENTION

The present invention relates to a removable hardtop for a vehicle, and more particularly to installation and storage of a vehicle hardtop.

Some automotive vehicles have removable hardtops. After removal, then, one must store the hardtop without damaging any portions of the hardtop. This may present some difficulty due to the weight and size of the hardtop.

To address this concern, some have created storage racks to support and protect the hardtop while not on the vehicle. However, these may be expensive, take up too much space, or not be available at the various locations one may wish to remove the hardtop from the vehicle. Accordingly, some merely set the hardtop on a floor of a garage or other hard surface. But this creates a potential for possible damage to the hardtop, such as damage to seals, locating pins, windows or paint, which is also undesirable.

SUMMARY OF THE INVENTION

An embodiment contemplates a vehicle with removable hardtop that includes vehicle sides having footrest cavities and pin recesses through top rails; hardtop sides having bottom edges mounted on the top rails; locating pins extending downward from the bottom edges into respective pin recesses; and footrests extending downward from the bottom edges, farther than the locating pins, into respective footrest cavities with greater clearance than the locating pins in the pin recesses.

An embodiment contemplates a vehicle with removable hardtop including vehicle sides having footrest cavities and pin recesses through top rails; hardtop sides having bottom edges mounted on the top rails; and integrated units, each including a mounting flange secured to one of the bottom edges, a locating pin extending downward from the mounting flange into a respective pin recess, and a footrest extending downward from the mounting flange farther than the locating pin, into a respective footrest cavity.

An advantage of an embodiment is that a hardtop may be removed from a vehicle and stored with protection for seals, locating pins and glass window along the bottom of the hardtop, without the need for a storage rack or other off vehicle storage assembly. Additionally, the footrests extending from the bottom of the hardtop may be employed as rough locators when mounting the hardtop back onto the vehicle.

DETAILED DESCRIPTION

Figure 1:
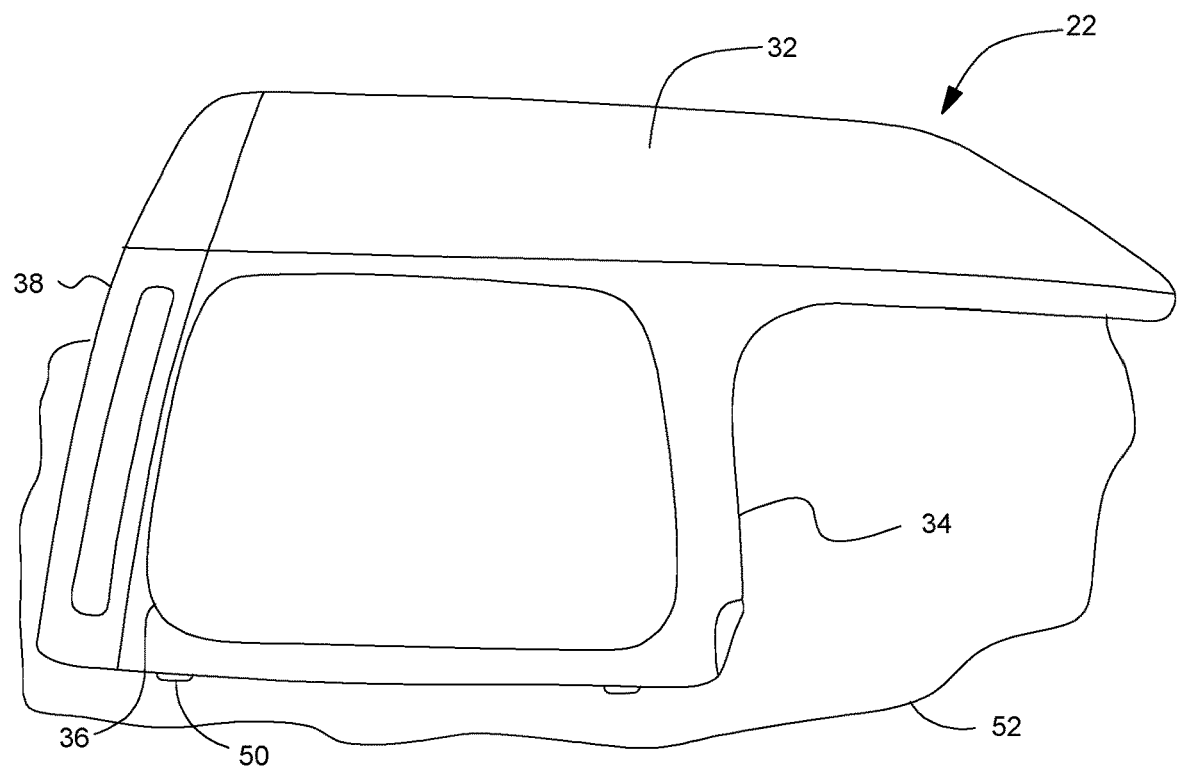
FIG. 1 is a perspective view of a hardtop resting on a hard surface.
Figure 2:
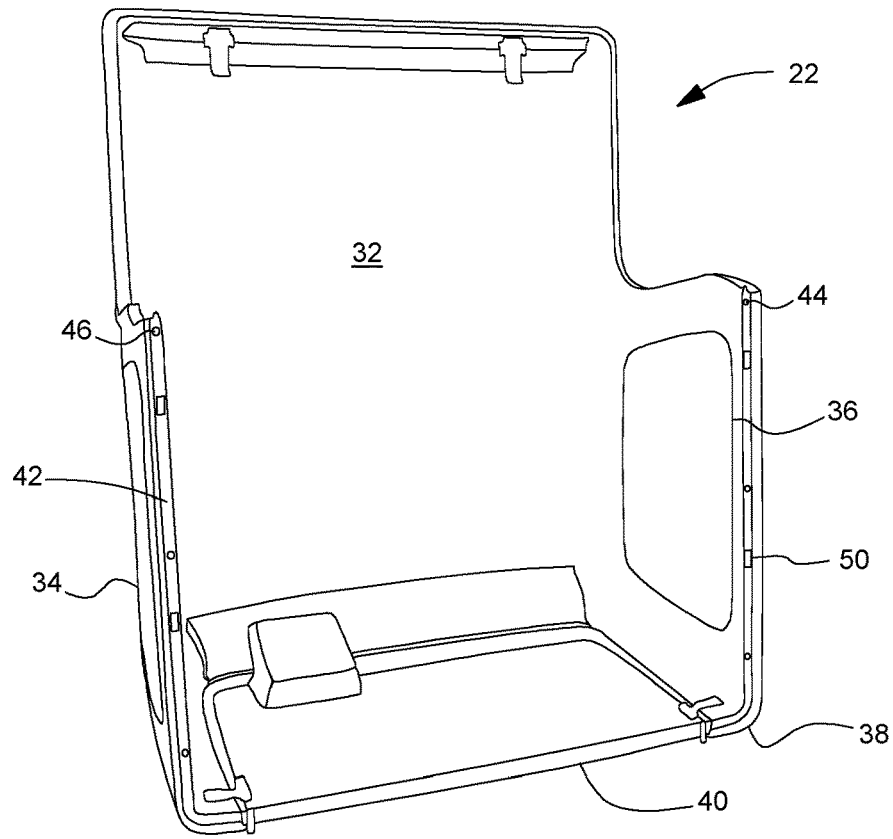
FIG. 2 is a perspective view of an underside of the hardtop.
Figure 3:
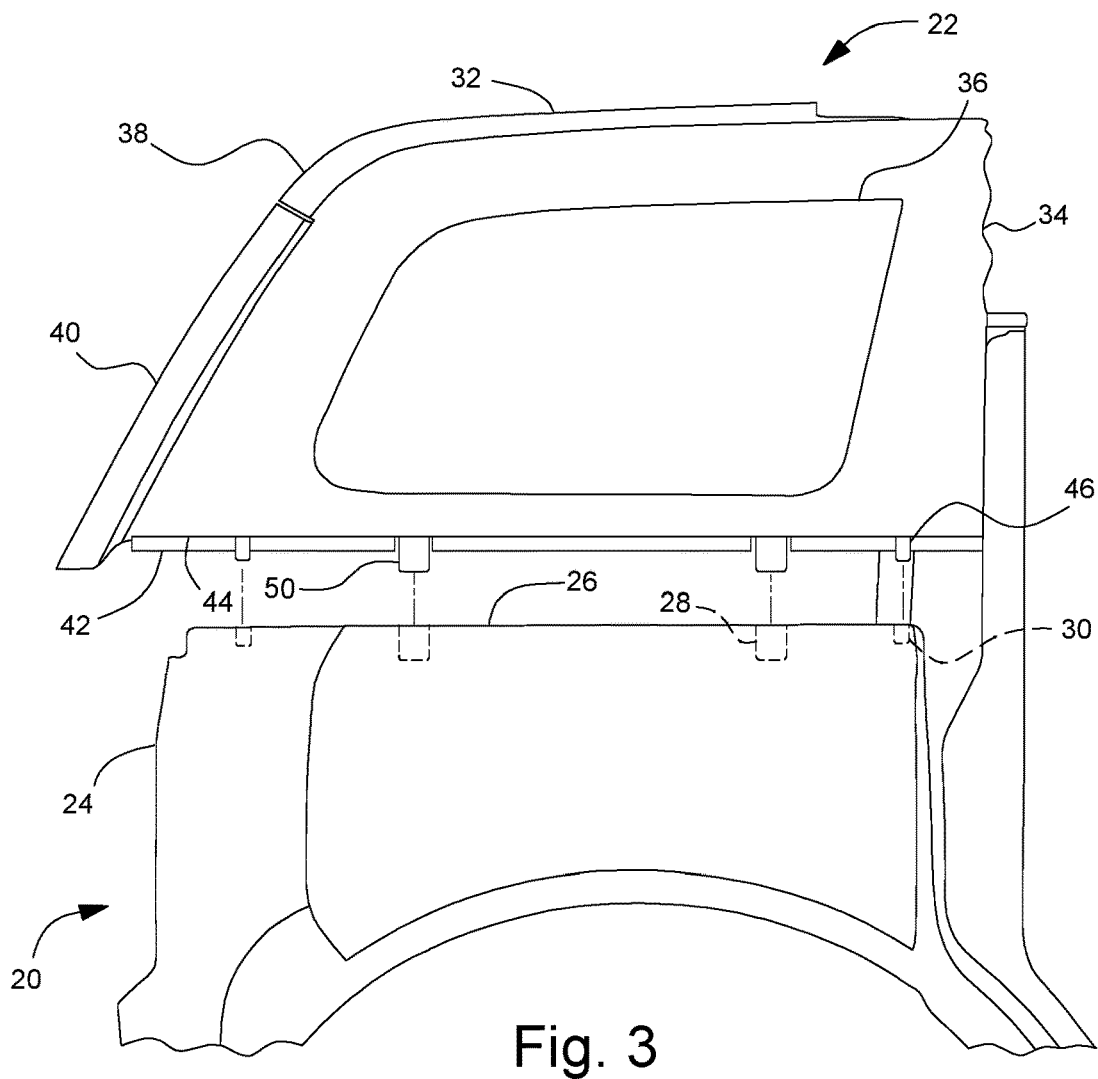
FIG. 3 is a schematic, side, partially exploded view of the hardtop above the mounting location on a vehicle.
Figure 4:
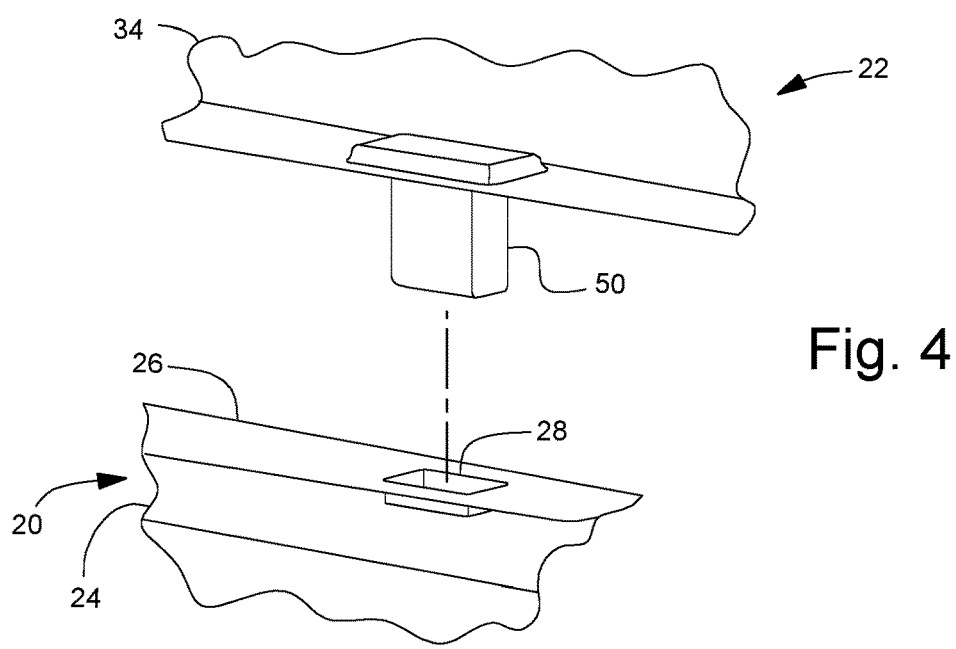
FIG. 4 is a schematic, partially exploded, perspective view of a portion of the hardtop above the mounting location on a vehicle.
Figure 5:
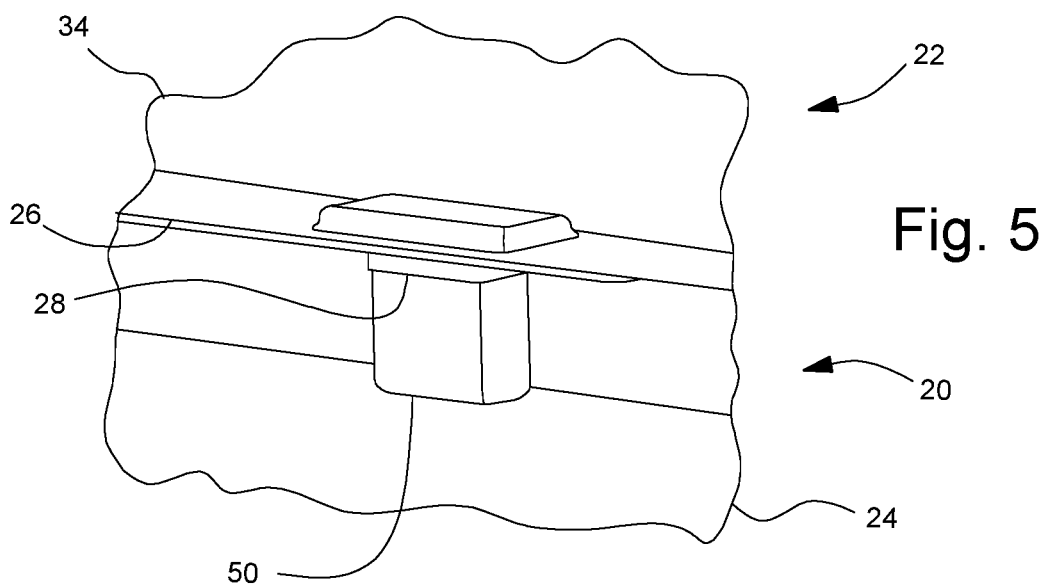
FIG. 5 is a schematic perspective view of a portion of the hardtop mounted to the vehicle.
Figure 6:
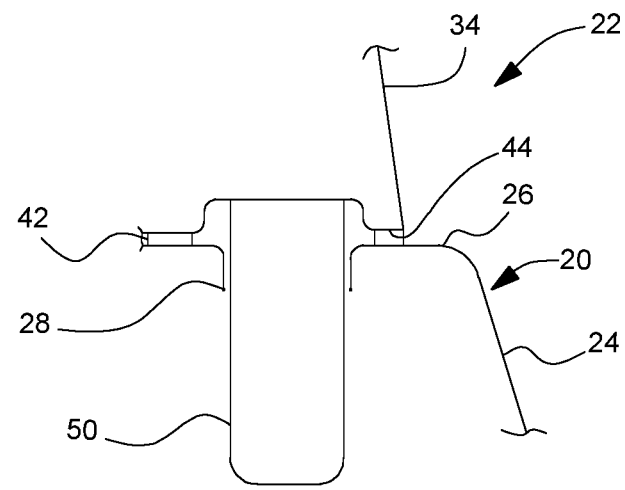
FIG. 6 is a schematic rearward-looking view of a portion of the hardtop mounted to the vehicle.

FIGS. 1-6 illustrate a vehicle 20 having a removable hardtop 22. The hardtop 22 is made to be completely removable from the vehicle 20, as opposed to a convertible top that merely folds down into a recess in the vehicle, and the hardtop 22 generally retains its shape, whether mounted on the vehicle 20 or removed and stored separate from the vehicle 20.

The vehicle 20 may include vehicle sides 24 with top rails 26 upon which the hardtop 22 mounts. Thus, with the hardtop 22 mounted on the sides 24, the space between the sides 24 is enclosed from the elements, and with the hardtop 22 removed, the space between the sides 24 is exposed to the elements. The top rails 26 include footrest cavities 28 and locating pin recesses 30.

The hardtop 22 may include a roof 32, sides 34, which may or may not include side windows 36, and rear wall 38, which may include a rear window 40 that may be able to selectively flip open while the hardtop 22 is mounted on the vehicle 20. Seals 42 may extend along a bottom surface 44 of the hardtop 22 and seal to the top rails 26 when the hardtop 22 is mounted on the vehicle 20.

Extending downward from the bottom surface 44 are locating pins 46. The locating pins 46 are located to precisely align with and slide into the locating pin recesses 30 when the hardtop 22 is properly aligned with and mounted on the vehicle 20 (i.e., fine locating, with minimal clearance). The alignment is fore-aft and side-to-side. The vertical location of the hardtop 22 is determined by the seals 42 resting on top of the top rails 26. Thus, the locating pins 46 extend downward from the bottom surface 44 farther than the seals 42.

Also extending downward from the bottom surface 44 are footrests 50. The footrests 50 extend farther downward than the locating pins 46 and bottom edge of the rear window 40 and are positioned to slide into the footrest cavities 28 when the hardtop 22 is generally close to being properly aligned with and mounted on the vehicle 20. The footrest cavities 28 may be large enough to allow for some play between the hardtop 22 and vehicle 20 (i.e., rough clearance), thus the footrests 50 act as rough locators when the footrests 50 begin to slide downward into the footrest cavities 28, with the locating pins 46 acting as fine (precise) locators (minimal clearance), which only slide into the corresponding locating pin recesses 30 when the hardtop 22 is fully (properly) aligned with the vehicle 20. This may allow for easier alignment of the hardtop 22 when being installed on the vehicle 20.

The term footrests, as used herein, includes members specifically capable of supporting the weight of the hardtop 22 when the hardtop 22 is set on a floor (or ground) 52 without damaging the footrests, and are long enough that no other portion of the hardtop 22 touches the floor 52 when the hardtop 22 is left on the floor 52 for storage. Thus, neither the locating pins 46, the seals 42 nor the bottom edge of the rear window 40 touch the floor 52 when the hardtop 22 is resting on the footrests 50. This helps protect these more easily damaged components (locating pins, seals, rear window) while the hardtop 22 is being stored separate from the vehicle 20. Accordingly, a storage rack is not needed to ensure no damage while the hardtop 22 is being stored.

Figure 7:
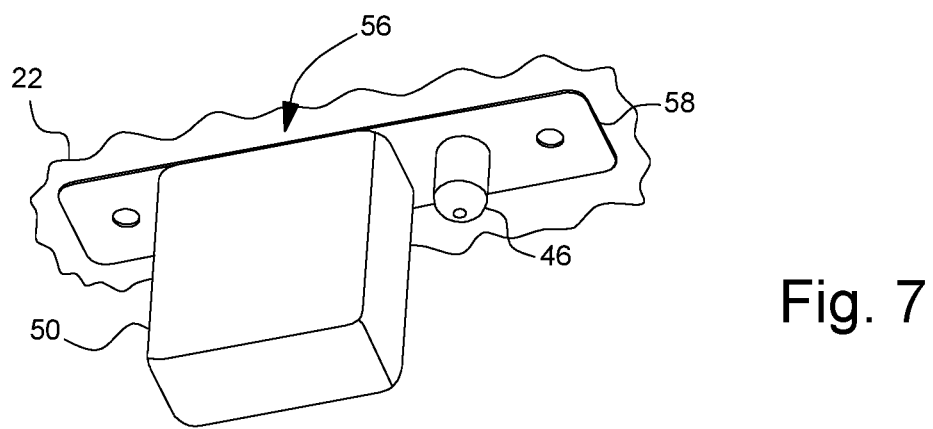
FIG. 7 is a schematic perspective view of a portion of a hardtop, with an integrated footrest and locating pin configuration.

FIG. 7 illustrates a portion of a hardtop 22, with integrated footrest-locating pin structure 56. The integrated footrest-locating pin structure 56 includes both a footrest 50 and a locating pin 46 integrated into a single piece for mounting to the hardtop 22. The integrated structure 56 may include mounting flanges 58 through which fasteners extend in order to secure the structure 56 to the hardtop 22. This integrated structure 56 essentially provides the same benefits as separate footrests and locator pins, with possible improved sealing around the footrest/pins, ease of removal and replacement of both a footrest and locator pin at same time should either be damaged during service.

While certain embodiments of the present invention have been described in detail, those familiar with the art to which this invention relates will recognize various alternative designs and embodiments for practicing the invention as defined by the following claims.

The invention claimed is:

1. A vehicle with removable hardtop comprising:
   vehicle sides having footrest cavities and pin recesses through top rails;
   hardtop sides having bottom edges mounted on the top rails;
   locating pins extending downward from the bottom edges into respective pin recesses;
   footrests extending downward from the bottom edges, farther than the locating pins, into respective footrest cavities with greater clearance than the locating pins in the pin recesses; and
   wherein the hardtop includes a rear window that extends downward farther than the hardtop sides, and the footrests extend downward farther than the rear window.

2. The vehicle of claim 1 wherein each footrest is integrated into an integrated unit with a respective locating pin, with each of the integrated units having a mounting flange secured to one of the bottom edges of the hardtop sides, and the corresponding footrest and locating pin secured to the mounting flange.

3. The vehicle of claim 1 wherein the footrests include four footrests, two on each side of the hardtop sides, each of the footrests extending downward from the bottom edges by the same amount, whereby the hardtop, when removed from the vehicle, is configured to rest on the four footrests without any other portion of the hardtop in contact with any surface upon which the hardtop rests.

4. The vehicle of claim 1 wherein the hardtop sides include seals along bottom edges of the hardtop sides.

5. A vehicle with removable hardtop comprising:
   vehicle sides having footrest cavities and pin recesses through top rails;
   hardtop sides having bottom edges mounted on the top rails;
   integrated units, each including a mounting flange secured to one of the bottom edges, a locating pin extending downward from the mounting flange into a respective pin recess, and a footrest extending downward from the mounting flange farther than the locating pin, into a respective footrest cavity.

6. The vehicle of claim 5 wherein the hardtop sides include seals along bottom edges of the hardtop sides.

7. The vehicle of claim 6 wherein the hardtop includes a rear window that extends downward farther than the hardtop sides, and the footrests extend downward farther than the rear window.

8. The vehicle of claim 5 wherein the footrests include four footrests, two on each side of the hardtop sides, each of the footrests extending downward from the bottom edges by the same amount, whereby the hardtop, when removed from the vehicle, is configured to rest on the four footrests without any other portion of the hardtop in contact with any surface upon which the hardtop rests.

9. A vehicle with removable hardtop comprising:
   vehicle sides having footrest cavities and pin recesses through top rails;
   hardtop sides having bottom edges mounted on the top rails;
   locating pins extending downward from the bottom edges into respective pin recesses; and
   footrests extending downward from the bottom edges, farther than the locating pins, into respective footrest cavities with greater clearance than the locating pins in the pin recesses, wherein the footrests include four footrests, two on each side of the hardtop sides, each of the footrests extending downward from the bottom edges by the same amount, whereby the hardtop, when removed from the vehicle, is configured to rest on the four footrests without any other portion of the hardtop in contact with any surface upon which the hardtop rests.

* * * * *